US012664809B2

(12) United States Patent
Weber et al.

(10) Patent No.: US 12,664,809 B2
(45) Date of Patent: Jun. 23, 2026

(54) SYSTEM AND METHOD FOR PROVIDING RECOMMENDATIONS BASED ON HANDWRITTEN DATA IN A HANDWRITTEN DOCUMENT

(71) Applicant: Wacom Co., Ltd., Saitama (JP)

(72) Inventors: Markus Weber, Düsseldorf (DE);
Jessica Priesmeyer, Düsseldorf (DE);
Goerkem Sinirlioglu, Düsseldorf (DE);
Nikolay Vasilev, Sofia (BG)

(73) Assignee: Wacom Co., Ltd., Saitama (JP)

( * ) Notice: Subject to any disclaimer, the term of this patent is extended or adjusted under 35 U.S.C. 154(b) by 359 days.

(21) Appl. No.: 18/457,089

(22) Filed: Aug. 28, 2023

(65) Prior Publication Data

US 2025/0078554 A1     Mar. 6, 2025

(51) Int. Cl.
*G06V 30/32* (2022.01)
*G06F 16/2457* (2019.01)

(52) U.S. Cl.
CPC ...... *G06V 30/347* (2022.01); *G06F 16/24578* (2019.01)

(58) Field of Classification Search
None
See application file for complete search history.

(56) References Cited

U.S. PATENT DOCUMENTS

2014/0334731 A1* 11/2014 Tripathi ............... G06V 30/274
                                                382/186
2016/0179764 A1*  6/2016 Kelso ................... G06F 40/171
                                                715/244
2022/0012409 A1*  1/2022 Kim ........................ G06V 10/25
2022/0156486 A1*  5/2022 Chen ...................... G06F 18/21
2023/0034513 A1*  2/2023 Cardozo ............... G06N 5/047

* cited by examiner

*Primary Examiner* — Andrew H Lam
(74) *Attorney, Agent, or Firm* — Seed Intellectual Property Law Group LLP

(57) ABSTRACT

A method for providing recommendations based on handwritten data in a handwritten document is disclosed. The method includes fetching the handwritten data corresponding to strokes made by a user in the handwritten document on a screen of an electronic device. The method also includes recognizing text associated with the fetched handwritten data by employing a handwriting recognition technique. The method further includes identifying keywords in the recognized text and determining recommendations based on the identified keywords using a named entity linking and/or a knowledge graph. The recommendations include handwritten documents stored in a database and/or weblinks. The method also includes ranking the determined recommendations based on a similarity score of each of the determined one or more recommendations with respect to the identified one or more keywords and rendering the ranked recommendations to the user.

20 Claims, 10 Drawing Sheets

300A 302          304          306

RECOGNITION MODULE 204 hello world

300B

102

RECOGNITION MODULE
204

RECOGNIZED TEXT
310

SEMANTIC INK IS A TECHNOLOGY TO SUPPORT THE
UNDERSTANDING OF DIGITAL INK.

IDENTIFIED KEYWORDS
312

KEYWORDS: SEMANTIC INK, DIGITAL INK

400A

108

| IDENTIFIED KEYWORDS 312 | RECOMMENDATION MODULE 206 | RECOMMENDED DOCUMENTS 402 |

700

702 START

704 FETCH HANDWRITTEN DATA FROM A HANDWRITTEN DOCUMENT ON A SCREEN OF AN ELECTRONIC DEVICE

706 RECOGNIZE TEXT ASSOCIATED WITH THE FETCHED HANDWRITTEN DATA

708 IDENTIFY KEYWORDS IN THE RECOGNIZED TEXT

710 DETERMINE RECOMMENDATIONS BASED ON THE IDENTIFIED KEYWORDS

712 RANK THE DETERMINED RECOMMENDATIONS

714 RENDER THE RANKED RECOMMENDATIONS TO THE USER

716 STOP

SYSTEM AND METHOD FOR PROVIDING RECOMMENDATIONS BASED ON HANDWRITTEN DATA IN A HANDWRITTEN DOCUMENT

BACKGROUND

Technical Field

The present disclosure relates to the field of handwritten data, and in particular, relates to a system and method for providing recommendations based on handwritten data in a handwritten document.

Description of the Related Art

With the fast-growing adaptation of digital writing pads, such as tablets, electronic boards, pen tablets, and the like, people have started taking more and more notes in the form of handwritten data in a handwritten document using digital writing pads. The handwritten documents provide various advantages, such as a personal touch of a user's handwriting, an authenticity of the documents, flexibility to customize and personalize based on personal preference for font, color, or style, and time-saving by allowing quick note taking. However, referring to one or more handwritten documents stored in a database could be a tedious task because handwritten text in a handwritten document is often difficult to recognize correctly or recognized at all.

Consequently, when preparing a handwritten document, if a user requires additional information from other handwritten notes stored in the database, the user must perform active searching by switching between applications. In one scenario, such active searching can be performed by searching for one or more keywords associated with the name of the one or more handwritten documents. However, the name of the one or more handwritten documents cannot be descriptive enough, which may lead to inaccuracy in searching. For example, the handwritten document 'Football' that has content about various football clubs in Spain will not be recommended (or found) if searching is performed for clubs of 'Spain,' and vice-versa. In another scenario, such active searching can be performed by opening and reading each handwritten document separately to identify the relevant document or relevant text in the document. Such is very time-consuming and causes serious inconvenience to the user.

Therefore, there is a need for a system and method to automatically provide reference to the one or more stored handwritten documents based on the handwritten data in the handwritten documents to overcome the above-mentioned drawbacks of the known technologies.

BRIEF SUMMARY

One or more embodiments are directed to a system and method for providing recommendations based on handwritten data in a handwritten document.

An embodiment of the present disclosure is directed to a system for providing personalized recommendations based on handwritten data in a handwritten document. The system includes a receiver module to fetch the handwritten data corresponding to strokes drawn by a user in the handwritten document on a screen of an electronic device. The electronic device corresponds to a touch-enabled device, a stylus-enabled device, and a pen-enabled device, including a mobile phone, a tablet, a personal computer, a digital signage, a smartboard, and a television. The handwritten data is received in the form of one or more tuples having data on x-axis, data on y-axis, pressure, speed of writing, orientation, or a combination thereof.

In some embodiments, the system includes a recognition module, which is configured to recognize text associated with the fetched handwritten data by employing a handwriting recognition technique and to identify one or more keywords in the recognized text. The handwriting recognition techniques may analyze each of the received one or more tuples to identify the closest recognized term that each of the received one or more tuples potentially represents. In some embodiments, the recognition module removes unnecessary data such as stop words, punctuation marks, and/or spaces, from the recognized text to identify the one or more keywords.

In some embodiments, the system includes a recommendation module to determine one or more personalized recommendations based on a user profile for the identified one or more keywords using a named entity linking and/or a knowledge graph. The one or more personalized recommendations include one or more handwritten documents stored in a database and/or one or more weblinks. In order to identify the one or more recommendations, the recommendation module matches the identified one or more keywords with one or more nodes of the knowledge graph to determine the one or more personalized recommendations. For determining the one or more personalized recommendations, the recommendation module performs sentence embeddings on the identified one or more keywords to form an updated set of keywords and to find a named entity corresponding to an updated set of keywords. Upon finding the named entity, the recommendation module performs a spreading activation of the found named entity to form a spreading activation graph and performs a similarity search using a similarity measure, such as a cosine distance, between embedding vectors to determine the one or more personalized recommendations. It may be understood that each of the one or more nodes is associated with identifiers of one or more documents stored in the database and/or one or more webpages. Further, the one or more personalized recommendations are associated with one or more relevant documents stored in the database and/or one or more webpages. Furthermore, the one or more personalized recommendations include addresses of the one or more corresponding relevant documents and/or relevant text from the one or more corresponding relevant documents. In some embodiments, the user profile is used to determine a need of the user for enhanced information related to the identified one or more keywords.

In some embodiments, the system includes a ranking module to rank the determined one or more personalized recommendations. The one or more personalized recommendations are ranked based on the relevancy of the one or more personalized recommendations to the identified one or more keywords. In some embodiments, the ranking module determines a similarity score of each of the determined one or more recommendations with respect to the identified one or more keywords. Upon determining the similarity scores, the ranking module ranks the determined one or more recommendations based on the determined similarity scores. In some embodiments, the system includes a rendering module to render the ranked one or more personalized recommendations to the user. The rendering includes displaying a dynamic window overlaying the handwritten document and including the one or more personalized recommendations.

An embodiment of the present disclosure discloses a method for providing personalized recommendations on handwritten data in a handwritten document. The method includes fetching the handwritten data corresponding to strokes made by a user in the handwritten document on a screen of an electronic device. The electronic device corresponds to a touch-enabled device, a stylus-enabled device, and a pen-enabled device, including a mobile phone, a tablet, a personal computer, a digital signage, a smartboard, and a television. Further, the handwritten data may be received in the form of one or more tuples having data on x-axis, data on y-axis, pressure, speed of writing, orientation, or a combination thereof.

In some embodiments, the method includes the steps of recognizing text associated with the fetched handwritten data by employing a handwriting recognition technique and identifying one or more keywords in the recognized text. Further, the handwriting recognition techniques may analyze each of the received one or more tuples to identify the closest recognized term that each of the received one or more tuples potentially represents. Additionally, the method includes the steps of removing unnecessary data from the recognized text to identify the one or more keywords, wherein the unnecessary data includes stop words, punctuation marks, spaces, or a combination thereof.

In some embodiments, the method includes the steps of determining one or more personalized recommendations based on a user profile of the user for the identified one or more keywords using a named entity linking and/or a knowledge graph. The one or more personalized recommendations include one or more handwritten documents stored in a database and/or one or more weblinks. The method includes the steps of matching the identified one or more identified one or more keywords with one or more nodes of the knowledge graph to determine the one or more personalized recommendations. For determining the one or more personalized recommendation, the method includes the steps of performing sentence embeddings on the identified one or more keywords to form an updated set of keywords and to find a named entity corresponding to an updated set of keywords. Upon finding the named entity, the method includes the steps of performing a spreading activation of the found named entity to form a spreading activation graph and performing a similarity search using a similarity measure, such as a cosine distance, between embedding vectors to determine the one or more personalized recommendations. The one or more personalized recommendations are associated with one or more relevant documents stored in the database and/or one or more webpages. Further, the one or more personalized recommendations include addresses of the one or more corresponding relevant documents and/or relevant text from the one or more corresponding relevant documents.

In some embodiments, the method includes the steps of ranking the determined one or more personalized recommendations. The one or more personalized recommendations are ranked based on the relevancy of the one or more personalized recommendations to the identified one or more keywords. In some embodiments, the ranking is performed by determining a similarity score of each of the determined one or more recommendations with respect to the identified one or more keywords. Upon determining the similarity scores, the determined one or more recommendations are ranked based on the determined similarity scores. In some embodiments, the method includes the steps of rendering the ranked one or more personalized recommendations to the user. The rendering includes displaying a dynamic window overlaying the handwritten document and including the one or more personalized recommendations.

The features and advantages of the disclosed subject matter here will become more apparent in light of the following detailed description of selected embodiments, as illustrated in the accompanying figures. As will be realized, the subject matter disclosed is capable of modifications in various respects, all without departing from the scope of the disclosed subject matter. Accordingly, the drawings and the description are to be regarded as illustrative in nature.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
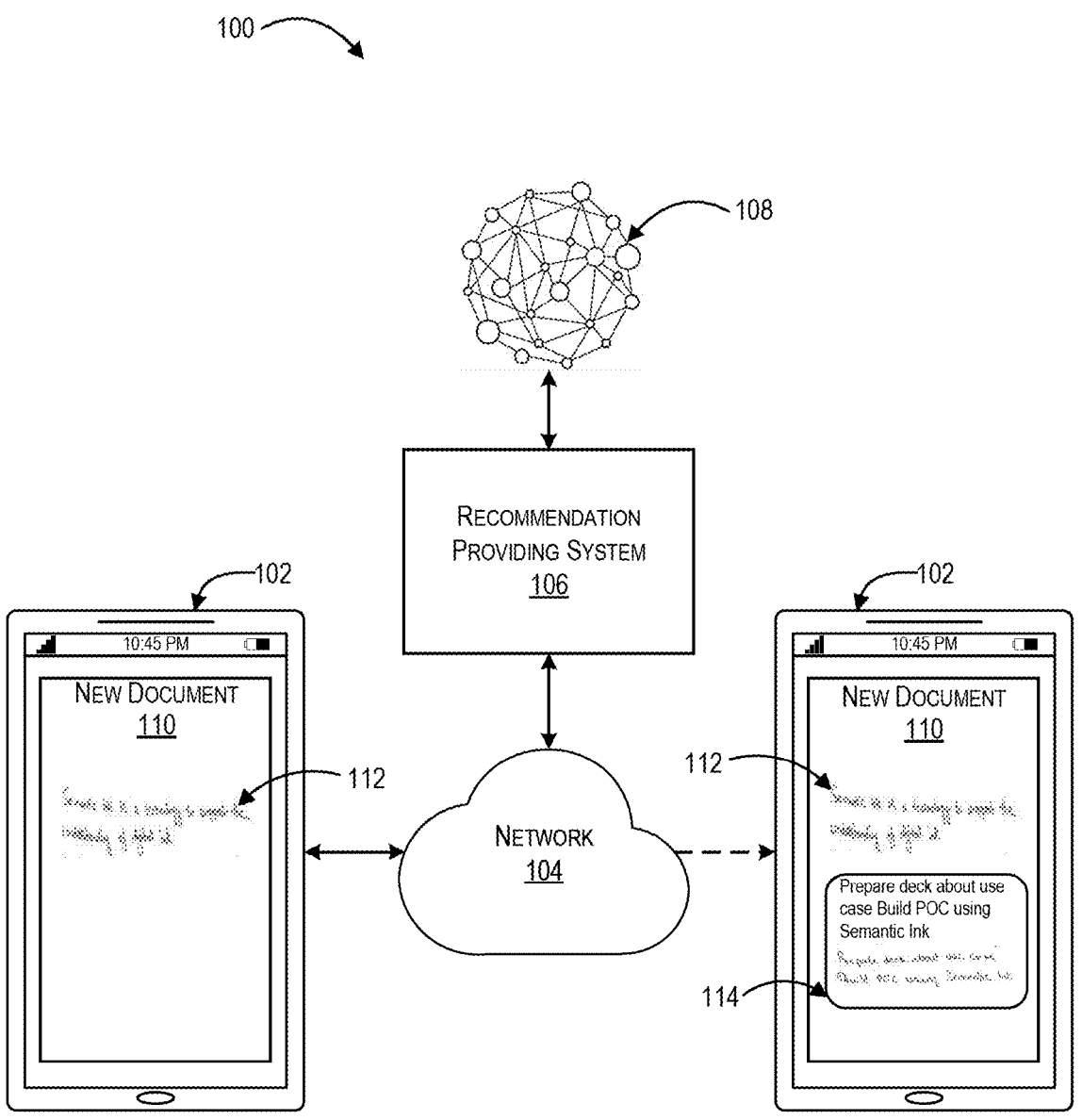
FIG. 1 illustrates an exemplary environment of a recommendation providing system for providing recommendations based on handwritten data in a handwritten document, in accordance with an embodiment of the present disclosure.

Other features of embodiments of the present disclosure will be apparent from accompanying drawings and detailed description that follows.

DETAILED DESCRIPTION

Embodiments of the present disclosure include various elements, functions and steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a system and a method for providing recommendations based on handwritten data in a handwritten document. The system includes fetching the handwritten data corresponding to strokes made by a user in the handwritten document on a screen of an electronic device. In some embodiments, the system recognizes text associated with the fetched handwritten data by employing a handwriting recognition technique and identifies one or more keywords in the recognized text. In some embodiments, the system determines one or more personalized recommendations based on a user profile of the user for the identified one or more keywords using a named entity linking and/or a knowledge graph. The one or more personalized recommendations include one or more handwritten documents stored in a database and/or one or more weblinks. In some embodiments, the system ranks the determined one or more personalized recommendations and renders the ranked one or more personalized recommendations to the user. For providing personalized recommendations on the one or more recognized text, the system may use pre-build recommendation indexes.

In general, there are two separate processes, one is "building the recommendation indexes" and the other is a "recommendation process". While building the recommendation index, the system creates two indexes, a similarity index and a knowledge graph (index). For building the similarity index, text is extracted using a text scrapping tool, from all accessible documents (e.g., pdf, word, PowerPoint or video, etc.). The extracted text is pre-processed by removing stop words, converting text to lowercase and/or performing lemmatization. Upon pre-processing the text, a similarity index may be built by computing sentence embeddings and vector embeddings and adding them to an AI similarity search index (e.g., Facebook AI Similarity Search (FAISS) index) for fast retrieval of the similar documents in future. For building the knowledge graph for the content, a Named Entity Linking is used to identify relevant terms that are captured in a domain. Further, both the similarity index and the knowledge graph are built for all the documents that can be recommended later by the system.

During the recommendation process a handwriting recognition is run for the handwritten document to recognize text. Sentence embeddings is performed on the one or more keywords of the recognized text and the named entity is found using Named Entity Linking from the knowledge graph. For the sentence embeddings on one or more keywords the FAISS index may be used. For the found named entities, the spreading activation graph is used. It may be noted that the content/knowledge graph may be built while building the recommendation index, and the spreading activation graph may be a small subgraph where the start of the activation is defined by the entities that have been found using the Named Entity Linking.

The system may perform a similarity search (e.g., Facebook AI Similarity Search (FAISS)) on the grouped contents using scalable fast index (such as by querying 'n' number of most similar recommendations) to determine the similarity score against the identified one or more keywords. In an exemplary embodiment, the similarity score may be provided in terms of a cosine distance, such as Document 1: URI—444423sff4f|Cosine distance—0.98|Concept Type—Document; and
Document 2: URI—fsah4hnfi|Cosine distance—0.97|Concept Type—Ink Note.

FIG. 1 illustrates an exemplary environment 100 of a recommendation providing system 106 for providing recommendations based on handwritten data 112 in a handwritten document 110, in accordance with an embodiment of the present disclosure. The handwritten document 110, for the purpose of the disclosure, corresponds to a digital document having the handwritten data 112. Such handwritten data 112 may correspond to one or more words on the digital document, a sentence on the digital document, or the whole digital document in general. Further, the handwritten data 112 may include static handwritten data and dynamic handwritten data. The static handwritten data may correspond to a geometrical data associated with the user's handwritten data, such as an image. The dynamic handwritten data may correspond to a chronological sampling of movement of the handwritten data 112, such as data on x-axis, data on y-axis, pressure, speed of writing, and orientation. The managing of the handwritten documents 110, for the purpose of the disclosure, corresponds to building a knowledge graph 108 including identifiers of the handwritten documents 110 as nodes, such that the handwritten documents 110 can be searched easily and efficiently. It may be understood that each identifier of a corresponding handwritten document 110 may be based on the content of the handwritten document 110 that may be obtained from the corresponding handwritten data 112.

In one embodiment of the present disclosure, as shown in FIG. 1, the environment 100 may include an electronic device 102 connected to a network 104, which in turn is connected to the recommendation providing system 106 having the knowledge graph 108. In an illustrated embodiment, to prepare the handwritten document 110, the user may access a user interface on the electronic device 102 to write data to be added to the handwritten document 110. The written data, hereinafter termed as the handwritten data 112, may include one or more words, one or more sentences, one or more paragraphs, shapes, and formulas. Further, the electronic device 102 may correspond to a touch-enabled device, a stylus enabled device, and a pen-enabled device permitting the user to input the handwritten data 112 in association with preparing the handwritten document 110 via touch, stylus, or pen. Accordingly, the electronic device 102 may, without any limitation, include a mobile phone, a tablet, a personal computer, a digital signage, a smartboard, and a television.

Further, the recommendation providing system 106 may fetch the handwritten data 112 from the handwritten document 110 to identify one or more keywords, for which the user may require additional information. Based on the identified one or more keywords, the recommendation providing system 106 may identify one or more relevant nodes of the knowledge graph 108. The identification of the one or more relevant nodes may facilitate the recommendation providing system 106 to fetch one or more corresponding documents that may be relevant to the user. In some embodiments, the recommendation providing system 106 may extract the relevant text from the fetched one or more documents that may be displayed, as recommendations, on the screen of the electronic device 102 for the reference of the user. In an illustrated embodiment, such recommendations may be displayed, in real-time, in a dynamic window 114 on the screen of the electronic device 102. Additionally, such recommendations may also include an addresses of the fetched one or more documents, which may be associated with either a database or webpages.

In some embodiments of the present disclosure, the recommendation providing system 106 may also be implemented on the electronic device 102, without departing from the scope of the disclosure. In such a scenario, the recommendation providing system 106 may provide one or more personalized recommendations based on documents stored in the database of the electronic device 102. In some embodiments, the documents stored in the database of the electronic device may not be limited to handwritten documents but all digital documents, such as PDFs, PowerPoint documents, word documents, or any other format of documents. For example, if a typed document is of importance to the user based on the identified keywords, then such typed document may also be provided to the user as a recommendation.

Figure 2:
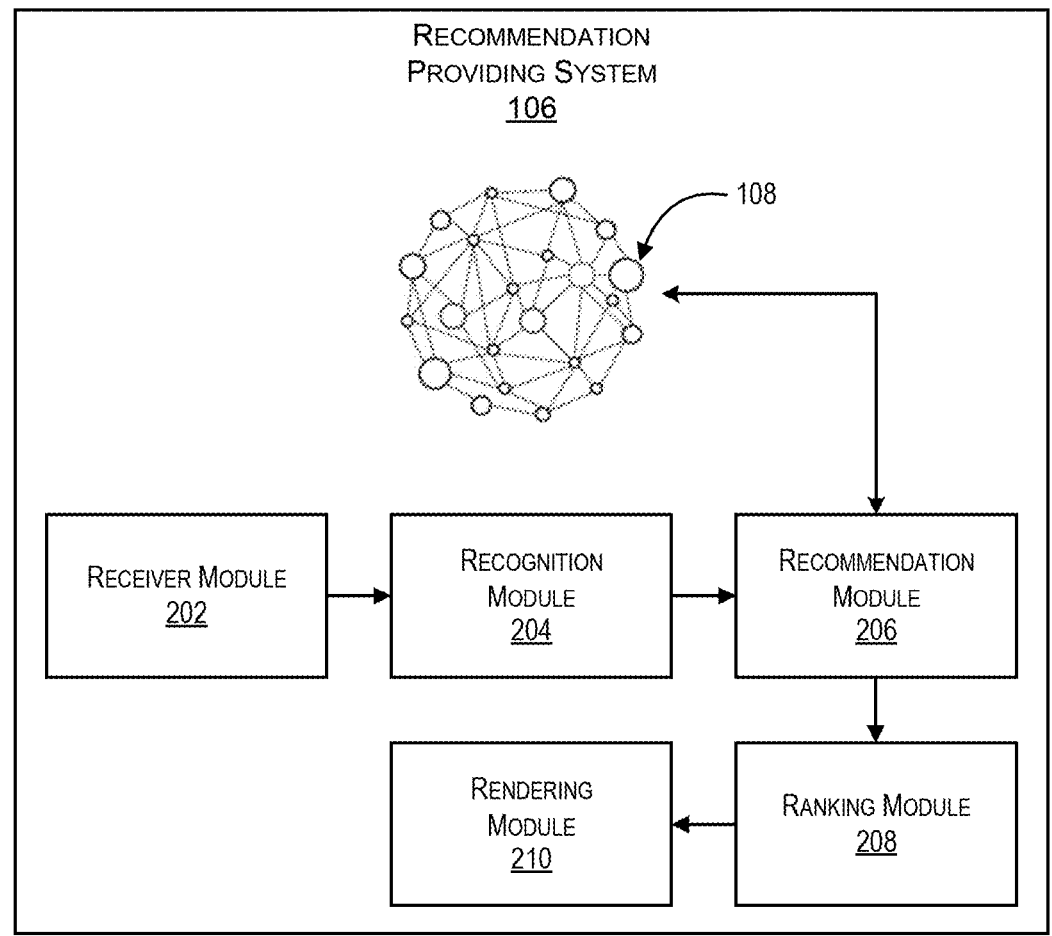
FIG. 2 illustrates a block diagram of the recommendation providing system for providing recommendations based on the handwritten data in the handwritten document, in accordance with an embodiment of the present disclosure.

FIG. 2 illustrates a block diagram of the recommendation providing system 106 (hereinafter termed as the system 106) for providing recommendations based on the handwritten data 112 in the handwritten document 110, in accordance with an embodiment of the present disclosure. In some embodiments, the system 106 may include a receiver module 202, a recognition module 204, a recommendation module 206, a ranking module 208, and a rendering module 210. The receiver module 202, the recognition module 204, the recommendation module 206, the ranking module 208, and the rendering module 210 may be communicatively coupled to a memory and a processor of the system 106.

The processor may control the operations of the receiver module 202, the recognition module 204, the recommendation module 206, the ranking module 208, and the rendering module 210. In an embodiment of the present disclosure, the processor and the memory may form a part of a chipset installed in the system 106. In another embodiment of the present disclosure, the memory may be implemented as a static memory or a dynamic memory. In an example, the memory may be internal to the system 106, such as an onside-based storage. In another example, the memory may be external to the system 106, such as cloud-based storage. Further, the processor may be implemented as one or more microprocessors, microcomputers, digital signal processors, central processing units, state machines, logic circuitries, and/or any devices that manipulate signals based on operational instructions.

In some embodiments, the receiver module 202 may fetch the handwritten data 112 corresponding to strokes made by the user in the handwritten document 110 on a screen of the electronic device 102. The handwritten data 112 may be received in the form of one or more tuples associated with the dynamic handwritten data. For example, the one or more tuples may be in a form of (x, y, p, s, o), wherein the 'x' may be data on x-axis, 'y' may be data on y-axis, 'p' may be pressure, 's' may be speed of writing, and 'o' may be orientation.

In some embodiments, the recognition module 204 may recognize text associated with the fetched handwritten data such as words, phrases, and sentences. Further, the text may be recognized by employing a handwriting recognition technique. To recognize the text, the handwritten recognition technique may analyze each of the received one or more tuples to identify the closest recognized term that each of the received one or more tuples potentially represents. In an embodiment of the present disclosure, the recognition module 204 may identify one or more keywords in the recognized text. To identify the one or more keywords, the recognition module 204 may remove unnecessary data such as unnecessary words, stop marks, punctuation marks, and spaces from the recognition text. The recognition module 204 may also remove connecting words and articles as well. For example, if the recognized text is 'Semantic ink is a technology to support the understanding of digital ink', then the recognition module 204 identifies 'Semantic ink' and 'digital ink' as keywords by removing 'is a technology to support the understanding of' from the recognized text. Such identified keywords may then be expanded for other contextually similar words and/or the synonyms by using the recommendation index. The recognition module 204 may be explained in detail and/or by way of example(s) in the following paragraphs.

In some embodiments, the recommendation module 206 may determine one or more personalized recommendations for the identified one or more keywords. In an embodiment of the present disclosure, the recommendation module 206 may identify one or more specific keywords of the identified one or more keywords, for which the user may need enhanced information based on a user profile of the user. After identifying such one or more keywords, the recommendation module 206 may utilize a named entity linking, the knowledge graph 108, or a combination thereof, to determine the one or more personalized recommendations. In some embodiments, each document may be analyzed to identify the one or more keywords in the document, using the named entity linked, to form a spreading activation graph. In general, the recommendation module 206 performs sentence embeddings on the identified one or more keywords to form an updated set of keywords and to find a named entity corresponding to an updated set of keywords. Upon finding the named entity, the recommendation module 206 performs a spreading activation of the found named entity to form a spreading activation graph and performs a similarity search using a similarity measure between embedding vectors to determine the one or more personalized recommendations. Such similarity measures may, without any limitation, include a cosine distance.

In order to determine the one or more personalized recommendations, the recommendation module 206 may match the identified one or more keywords (e.g., from the spreading activation graph) with one or more nodes of the knowledge graph 108. In an embodiment of the present disclosure, each of the one or more nodes of the knowledge graph 108 may be associated with identifiers of one or more documents stored in the database and/or one or more webpages. Accordingly, the one or more personalized recommendations are associated with one or more relevant documents stored in the database and/or the one or more webpages. In an embodiment of the present disclosure, the one or more personalized recommendations may, without any limitation, include addresses of the one or more corresponding relevant documents, relevant texts from the one or more corresponding relevant documents, or a combination thereof. The recommendation module 206 may be explained in detail and/or by way of example(s) in the following paragraphs.

In some embodiments, the ranking module 208 may rank the determined one or more personalized recommendations. The ranking module 208 may rank the one or more personalized recommendations based on the relevancy of the one or more personalized recommendations to the identified one or more keywords. In some embodiments, the ranking module 208 determines a similarity score of each of the determined one or more recommendations with respect to the identified one or more keywords. In an embodiment, the one or more recommendations may be link to a pdf, a word document, a video, a PowerPoint document, or a handwritten document. In order to determine the similarity score, all accessible documents are pre-processed.

In some embodiments, the ranking module 208 may built an association graph of the one or more recommendations with a pre-defined depth (such as depth 2) by using a named entity linking in order to identify relevant terms that may be captured in the domain. Then, the ranking module 208 may identify shared entities between the current document and the one or more recommendations and count the number of such shared entities. The ranking module 208 may then compute the average path length between shared entities within the knowledge graph and normalize the entity count by dividing it by the total number of unique entities present in both documents. Thereafter, the ranking module 208 may normalize the average path by dividing it by a maximum path length to determine the similarity score by the following formula:

$$Similarity = alpha * cosine\_similarity + beta * normalized\_entity\_count +$$
$$gamma * 1 - normalized\_average\_path\_length$$

wherein, the alpha, beta, and gamma are weights that indicate which of semantic hits or the text similarity is more important. Such weights can be adapted depending on the domain of an existing knowledge graph. Further, if the knowledge graph is well-structured and covers the domain well, the values of beta and gamma may be increased.

Upon determining the similarity scores, the ranking module 208 ranks the determined one or more recommendations based on the determined similarity scores. In some embodiments, the rendering module 210 may render the ranked one or more personalized recommendations. The rendering module 210 may render the ranked one or more personalized recommendations by way of displaying the dynamic window 114 or a paginated list. In an embodiment of the present disclosure, the dynamic window 114 may overlay the handwritten document and may, without any limitation, include the one or more personalized recommendations. In another embodiment of the present disclosure, the user may open the recommendation, and the paginated list of the ranked one or more personalized recommendations may be rendered to the user.

Figure 3A:
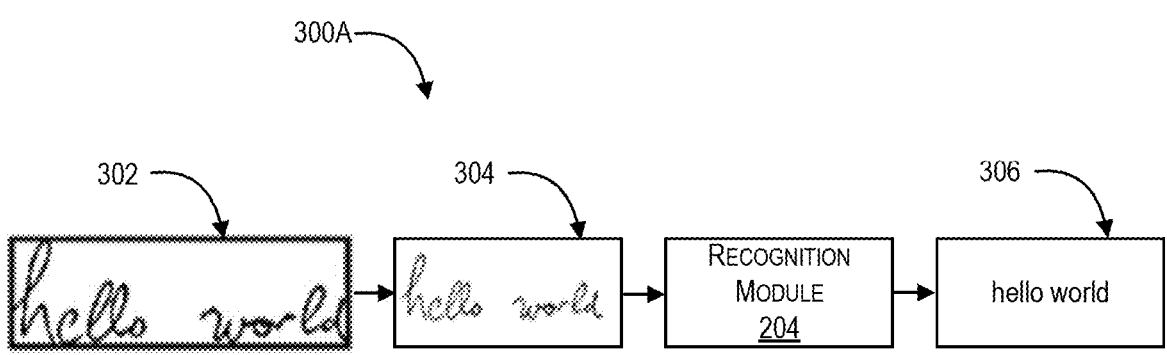
FIG. 3A illustrates an exemplary text recognized by a recognition module, in accordance with an embodiment of the present disclosure.
Figure 3B:
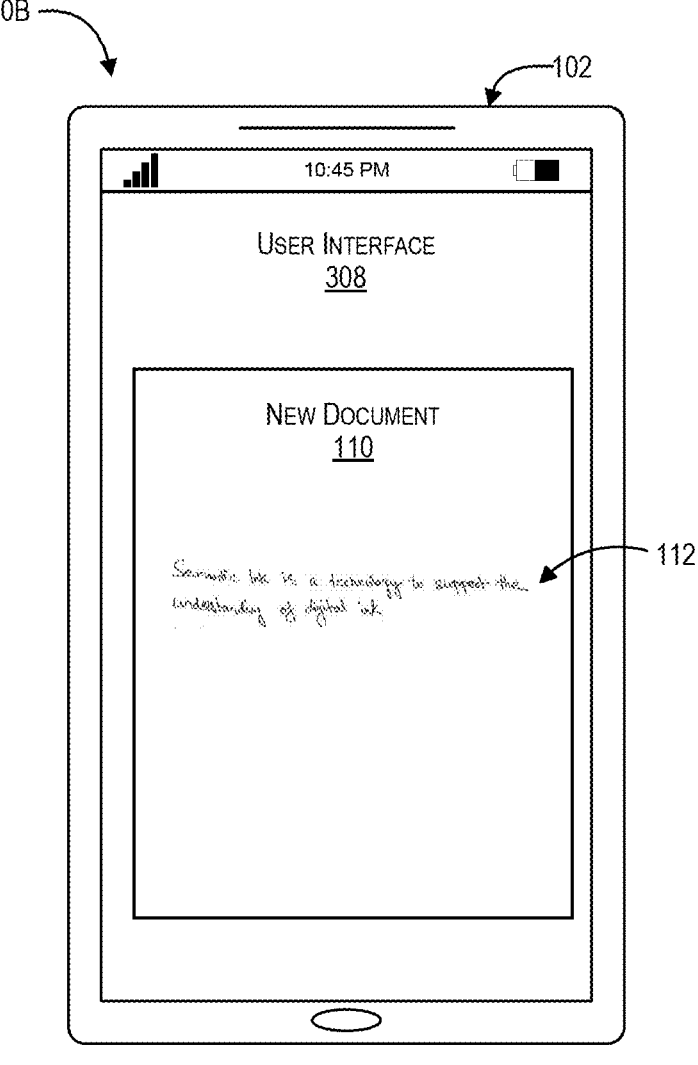
FIG. 3B illustrates an exemplary handwritten data received on an electronic device, in accordance with an embodiment of the present disclosure.
Figures 3C, 4A:
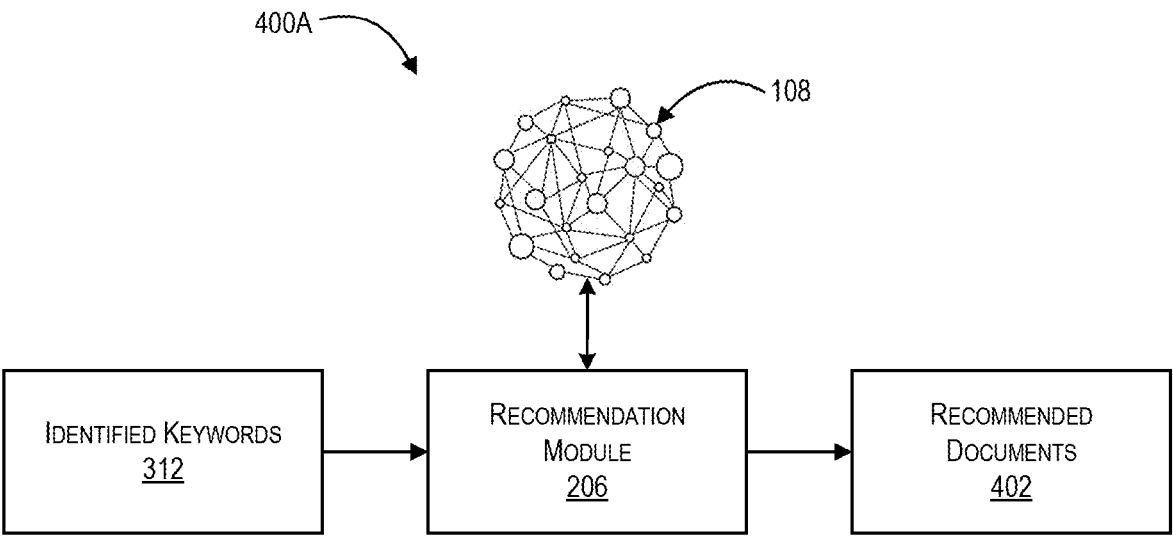
FIG. 3C illustrates an exemplary recognized text by a recognition module, in accordance with an embodiment of the present disclosure.
FIG. 4A illustrates an exemplary block diagram of providing a recommendation of one or more documents by a recommendation module, in accordance with an embodiment of the present disclosure.

FIG. 3A illustrates an exemplary text recognized by a recognition module, in accordance with an embodiment of the present disclosure. FIG. 3B illustrates an exemplary handwritten data received on an electronic device, in accordance with an embodiment of the present disclosure. FIG. 3C illustrates an exemplary recognized text by a recognition module, in accordance with an embodiment of the present disclosure. For the sake of brevity of explanation, FIGS. 3A-3C will be explained together. In an illustrated embodiment, the recognition module 204 may receive a handwritten document 302 having a handwritten text as an object 304. As shown, the handwritten text indicates 'hello world'. The recognition module 204 may process the handwritten document 302 to extract the object 304 from the handwritten document 302. Further, the recognition module 204 may use an Ink-to-text model to recognize the potential term 306, i.e., 'hello world'.

In an illustrated embodiment of the present disclosure, as shown in FIG. 3B, the electronic device 102 may provide a user interface 308 to facilitate the user to form the handwritten document 110 such as a new document. To form the new document, the user may add the handwritten text 112 such as 'Semantic ink is a technology to support the understanding of digital ink' in the new document by writing on the screen of the electronic device 102 via touch, stylus, or pen.

In an illustrated embodiment of the present disclosure, as shown in FIG. 3C, the recognition module 204 may recognize the handwritten text 112, mentioned above, as a recognized text 310, i.e., 'Semantic ink is a technology to support the understanding of digital ink'. Further, the recognition module 204 may identify one or more keywords 312 from the recognized text 310, i.e., "Semantic ink" and "digital ink".

Figure 4B:
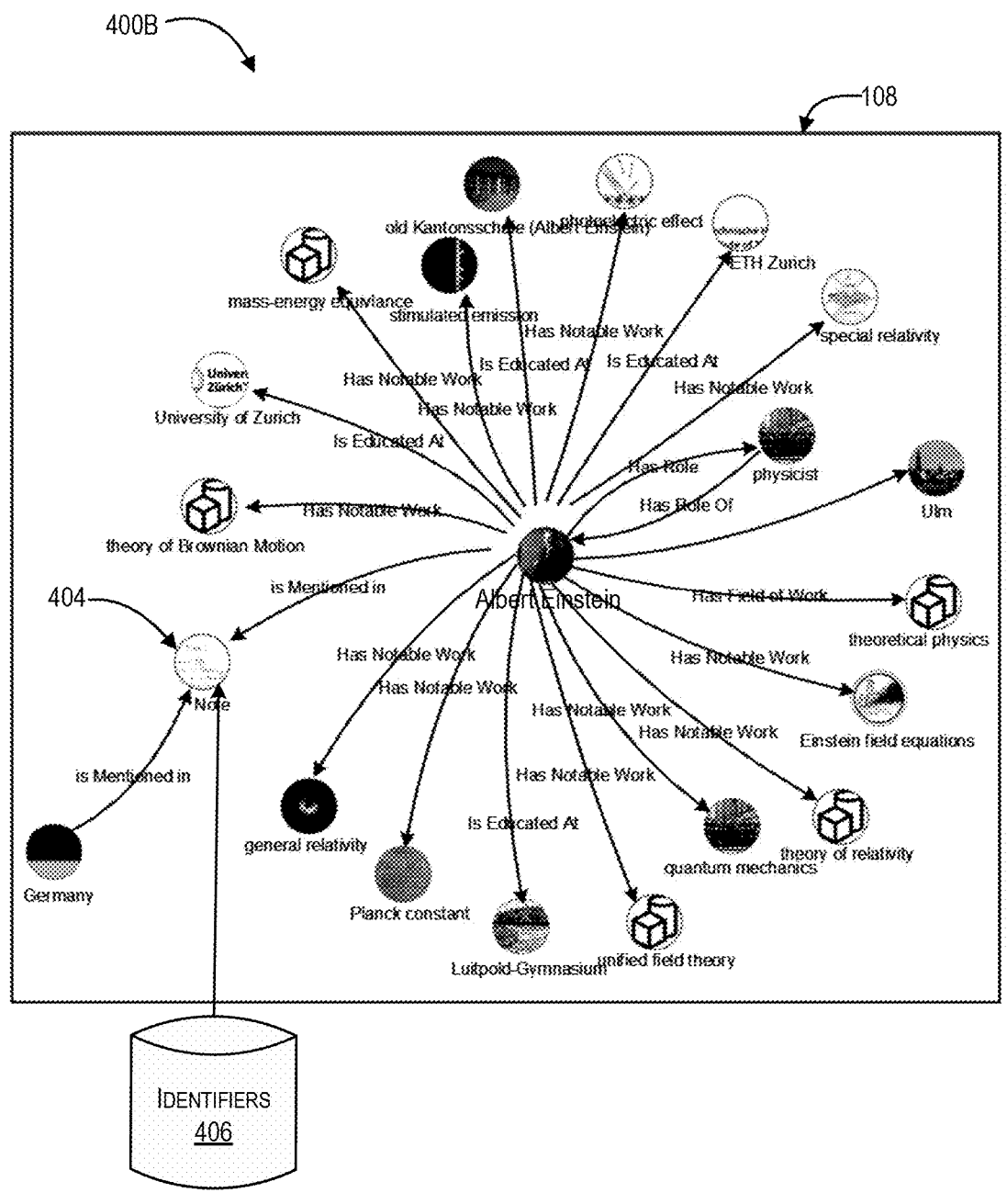
FIG. 4B illustrates an example of the knowledge graph with an identifiers database, in accordance with an embodiment of the present disclosure.
Figure 4C:
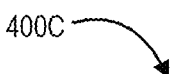
FIG. 4C illustrates an example of the knowledge graph with a current handwritten document, in accordance with an embodiment of the present disclosure.

FIG. 4A illustrates an exemplary block diagram 400A of providing a recommendation of one or more documents 402 by the recommendation module 208, in accordance with an embodiment of the present disclosure. FIG. 4B illustrates an example 400B of the knowledge graph 108 with an identifiers database 404, in accordance with an embodiment of the present disclosure. FIG. 4C illustrates an example 400C of the knowledge graph 108 with current handwritten document 408, in accordance with an embodiment of the present disclosure. For sake of brevity of explanation, FIGS. 4A-4C will be explained together.

As illustrated in FIG. 4A, the recommendation module 206 may receive the one or more identified keywords 312 (e.g., 'semantic ink', 'digital ink') and may identify if the user may need enhanced information about any of the one or more identified keywords 312 using the user profile (e.g., the user profile may show that the user has very little knowledge about 'semantic ink'). Based on such identification, the recommendation module 206 may identify one or more nodes 404 of the knowledge graph 108 (e.g., one or more nodes having identifiers 'Ink technologies', 'owner of semantic ink', and 'inventor of semantic ink'). Further, as illustrated in FIG. 4B, the one or more identifiers associated with each of the one or more nodes 404 may be stored in an identifier database 406 and one or more documents may be associated with the one or more identifiers. In some embodiments, the one or more identifiers may be based on one or more words in the documents, concept of the documents, title of the documents, name of the documents, or a combination thereof. For example, the identifier 'ink technologies' may be associated with a document titled 'New technologies of Wacom', and the identifiers 'owner of semantic ink' and 'inventor of semantic ink' may be associated with a document titled 'Upcoming technologies in Japan'. Accordingly, the recommendation module 206 may fetch such one or more documents that may be relevant to the user, so as to provide more information about the identified one or more keywords (e.g., 'semantic ink'). Based on the fetched one or more documents, the recommendation module 206 may determine recommendations to be provided to the user, such as relevant text from the fetched one or more documents and addresses of the one or more documents.

In some embodiments, as illustrated in FIG. 4C, the current handwritten document 408 may be stored as a node of the knowledge graph 108. Further, the one or more recommended documents 410A, 410B, 410C may also be stored as nodes of the knowledge graph 108. Thereafter, the ranking module 208 may find the similarity score of the current handwritten document 408 with each of the one or more recommended documents 410A, 410B, 410C to rank the one or more recommended documents 410A, 410B, 410C. In an embodiment, the user may be prompted to open the recommendations, and the paginated list of the recommendations based on the ranked one or more recommended documents 410A, 410B, 410C may be rendered for the user.

Figure 5:
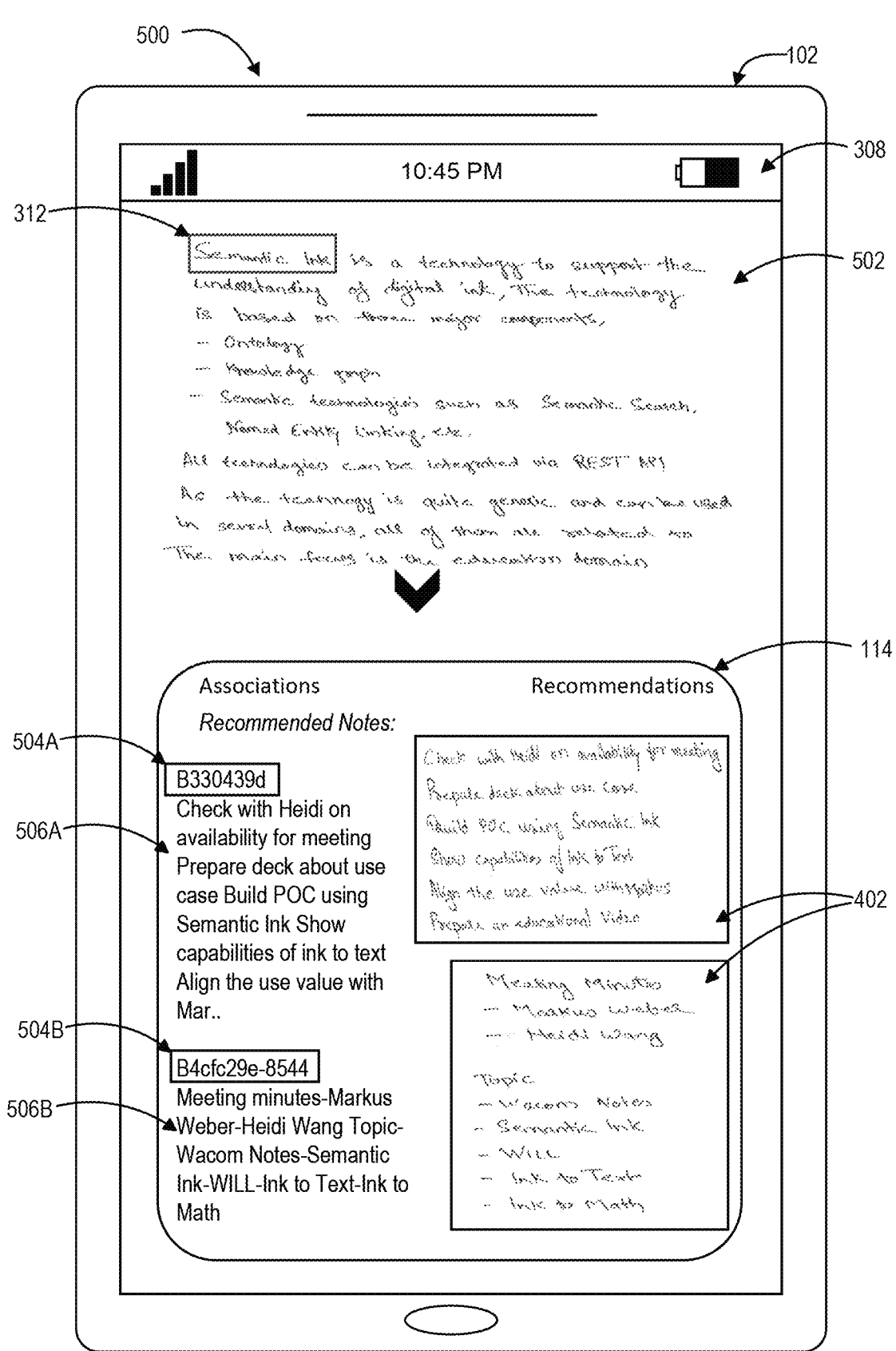
FIG. 5 illustrates an exemplary dynamic window with one or more recommendations displayed on the electronic device, in accordance with an embodiment of the present disclosure.

FIG. 5 illustrates an example 500 of the dynamic window 114 with one or more personalized recommendations displayed on the electronic device 102, in accordance with an embodiment of the present disclosure. As illustrated, the electronic device 102 may have the user interface 308 to facilitate the user to write text in a document 502. The system 100 may process the written text to identify the keyword 312 such as 'semantic ink', about which the user may need enhanced information. Upon identifying the keyword 312, the system 100 may utilize the knowledge graph 108 to recognize nodes 404 that are relevant to the identified keyword 312 based on the identifiers associated with the one or more nodes of the knowledge graph.

In some embodiments, the system 100 may access the identifier database 406 to fetch the one or more documents 402 that may be relevant to the identified keyword 312 for providing enhance information about the identified keyword 312. In an illustrated embodiment, the system 100 may provide recommendations to the user in the dynamic window 114 that may automatically be displayed over the document 502. As illustrated, the dynamic window 114 may include an addresses 504A and 504B of the corresponding fetched documents, such as 'B330439d' and 'B4cfc293-8544'. Additionally, or alternatively, the dynamic window 114 may also include relevant text from the corresponding fetched documents, as shown 506A and 506B, to facilitate the user to refer to the enhanced information from the corresponding documents without opening the documents.

As a result, the user receives enhanced information automatically about the words, which the user may not be familiar with, thereby increasing convenience and time-efficiency for the user.

Figure 6A:
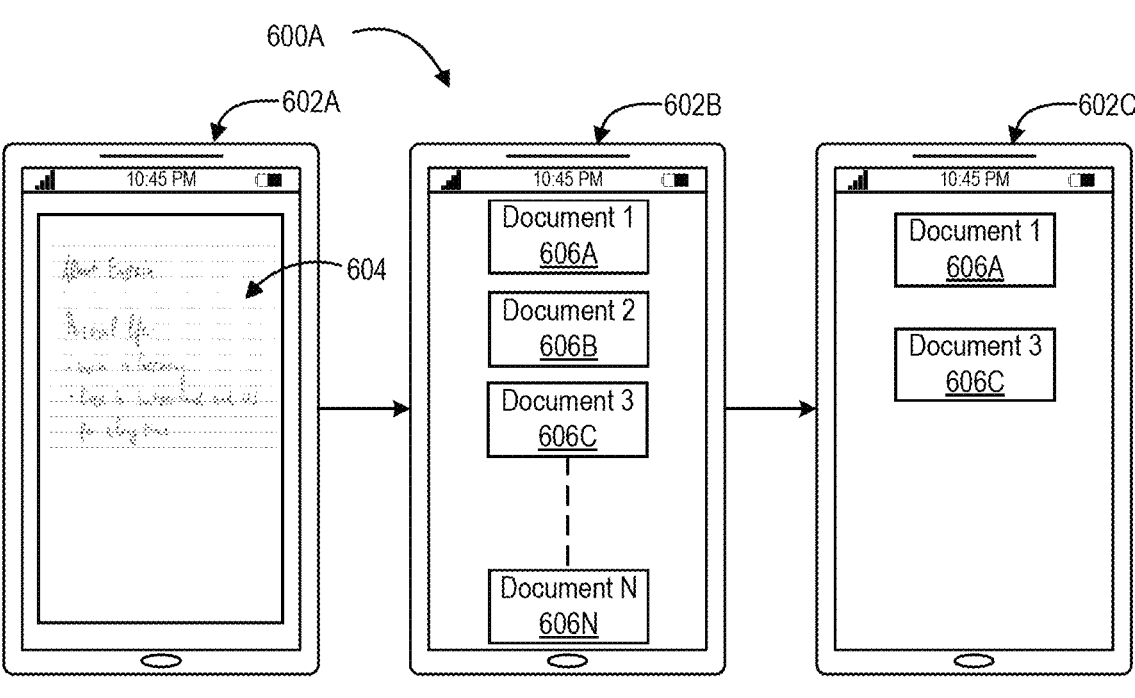
FIG. 6A illustrates exemplary interfaces associated with finding relevant documents via a traditional system.

FIG. 6A illustrates an example 600A showing exemplary interfaces associated with finding relevant documents via a traditional system. In the traditional systems, when the user may write text on the electronic device as shown in 602A and the user requires more information about one or more words in the written text, then the user has to switch from the handwriting application and perform an active search for stored handwritten documents in the database. Since the handwritten documents have handwritten data, the handwritten documents cannot be searched like the traditional search for typed digital documents. Thus, in order to perform the active search for the handwritten documents stored in the database, the user must access the database to manually open and check each of the one or more stored documents 606A, 606B, 606C, . . . , 606N, as shown by 602B, and fetch relevant documents such as 606A and 606C, as shown by 602C. Therefore, the traditional systems are inconvenient to the user and consume a lot of time when the user wants to refer to one or more stored handwritten documents for more information.

Figure 6B:
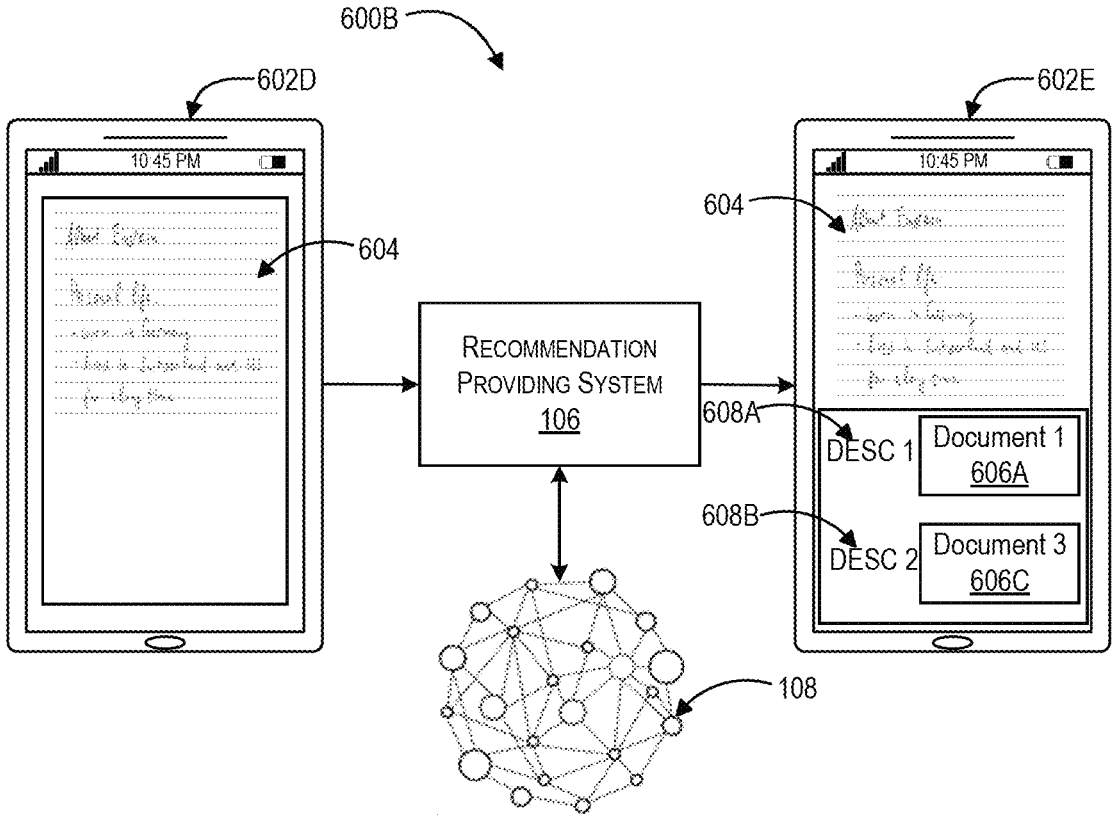
FIG. 6B illustrates exemplary interfaces associated with providing recommendations to the user, in accordance with an embodiment of the present disclosure.

FIG. 6B illustrates an example 600B showing exemplary interfaces associated with providing recommendations to the user, in accordance with an embodiment of the present disclosure. In an embodiment of the present disclosure, when the user writes text on the electronic device, as shown in 602D, the system 100 automatically fetches the handwritten text from the handwritten document 604 and identifies one or more keywords from the handwritten text. Upon identifying the one or more keywords, the system 100 identifies from the one or more identified keywords, the keywords for which the user may require more information based on the user profile. Further, the system 100 may utilize the knowledge graph 108 to determine one or more documents 608A and 608C that may be relevant to provide enhanced information to the user, as explained in detail in the previous paragraphs. Additionally, as illustrated, the system 100 may display the dynamic window 114 to provide personalized recommendations to the user for required enhanced information based on the determined one or more documents 608A and 608C. In an illustrated embodiment, the dynamic window 114 may include the relevant text 608A and 608C from the corresponding documents 606A and 606C, respectively, such that the user may refer to such documents without switching applications and/or performing the active search as in the traditional system.

Figure 7:
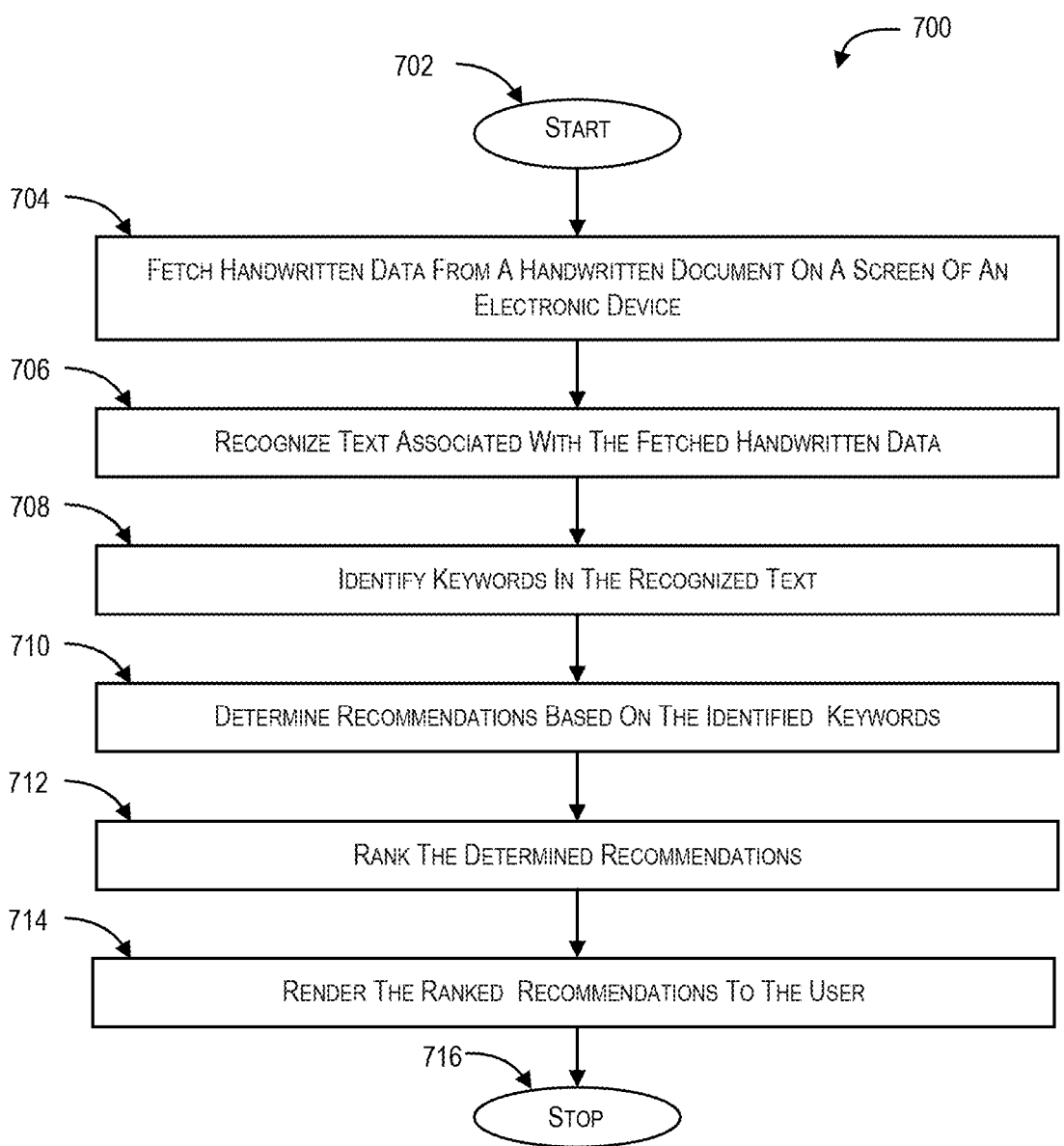
FIG. 7 illustrates a flowchart of a method for providing recommendations based on handwritten data in a handwritten document, in accordance with an embodiment of the present disclosure.

FIG. 7 illustrates a flowchart 700 of a method for providing recommendations based on handwritten data in a handwritten document, in accordance with an embodiment of the present disclosure. The method starts at step 702.

At first, the handwritten data may be fetched, at step 704. The handwritten data may correspond to strokes made by a user in the handwritten document on a screen of an electronic device. The electronic device may correspond to a touch-enabled device, a stylus-enabled device, and a pen-enabled device. Further, the electronic device may, without any limitation, include a mobile phone, a tablet, a personal computer, a digital signage, a smartboard, and a television. In an embodiment, the handwritten data may be received in the form of one or more tuples having data on x-axis, data on y-axis, pressure, speed of writing, orientation, or a combination thereof.

Further, text associated with the fetched handwritten data may be recognized, at step 706. The recognition of the text may be performed by employing a handwriting recognition technique. The handwriting recognition techniques may analyze each of the received one or more tuples to identify the closest recognized term that each of the received one or more tuples potentially represents. Further, one or more keywords in the recognized text may be identified, at step 708.

Further, one or more personalized recommendations may be determined, based on a user profile of the user, for the identified one or more keywords, at step 710. In an embodiment, the user profile may be used to determine the need of the user for enhanced information related to the identified one or more keywords. Further, the determination of the one or more personalized recommendations may be performed using a named entity linking, a knowledge graph, or a combination thereof. In order to determine the one or more personalized recommendations, the method may include the steps of matching the identified one or more keywords with one or more nodes of the knowledge graph. In an embodiment of the present disclosure, the one or more personalized recommendations may include one or more handwritten documents stored in a database and/or one or more weblinks. In another embodiment, the one or more personalized recommendations may be associated with one or more relevant documents stored in the database and/or one or more webpages. In some embodiments, the one or more personalized recommendations may include addresses of the one or more corresponding relevant documents and/or relevant text from the one or more corresponding relevant documents.

Further, the determined one or more personalized recommendations may be ranked, at step 712. The one or more personalized recommendations may be ranked based on the relevancy of the one or more personalized recommendations to the identified one or more keywords. In some embodiments, the steps of ranking are performed by determining a similarity score of each of the determined one or more recommendations with respect to the identified one or more keywords. Upon determining the similarity scores, the determined one or more recommendations are ranked based on the determined similarity scores.

Further, the ranked one or more personalized recommendations are rendered (displayed) for the user, at step 714. The rendering may include displaying a dynamic window overlaying the handwritten document and including the one or more personalized recommendations. The method ends at step 716.

Figure 8:
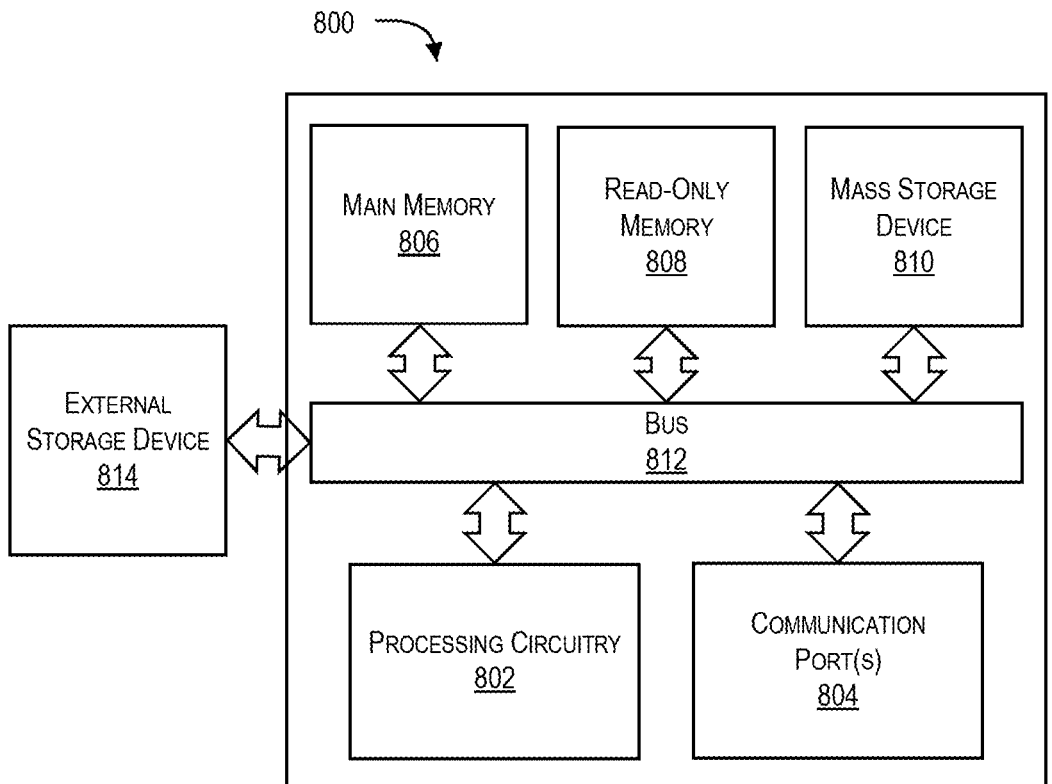
FIG. 8 illustrates an exemplary computer system in which or with which embodiments of the present disclosure may be utilized.

FIG. 8 illustrates an exemplary computer system in which or with which embodiments of the present disclosure may be utilized. As shown in FIG. 8, a computer system 800 includes an external storage device 814, a bus 812, a main memory 806, a read-only memory 808, a mass storage device 810, a communication port 804, and a processor 802.

Those skilled in the art will appreciate that computer system 800 may include more than one processor 802 and communication ports 804. Examples of processor 802 include, but are not limited to, an Intel® Itanium® or Itanium 2 processor(s), or AMD® Opteron® or Athlon MP® processor(s), Motorola® lines of processors, Forti-SOC™ system on chip processors or other future processors. The processor 802 may include various modules associated with embodiments of the present disclosure.

The communication port 804 can be any of an RS-232 port for use with a modem-based dialup connection, a 10/100 Ethernet port, a Gigabit or 10 Gigabit port using copper or fiber, a serial port, a parallel port, or other existing or future ports. The communication port 804 may be chosen depending on a network, such as a Local Area Network (LAN), Wide Area Network (WAN), or any network to which the computer system connects.

The memory 806 can be Random Access Memory (RAM), or any other dynamic storage device commonly known in the art. Read-Only Memory 808 can be any static storage device(s), e.g., but not limited to, a Programmable Read-Only Memory (PROM) chips for storing static information, e.g., start-up or BIOS instructions for processor 802.

The mass storage 810 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 812 communicatively couples processor(s) 802 with the other memory, storage, and communication blocks. The bus 812 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 802 to a software system.

Optionally, operator and administrative interfaces, e.g., a display, keyboard, and a cursor control device, may also be coupled to bus 804 to support direct operator interaction with the computer system. Other operator and administrative interfaces can be provided through network connections connected through communication port 804. An external storage device 810 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments. Numerous modifications, changes, variations, substitutions, and equivalents will be apparent to those skilled in the art, without departing from the scope of the disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . , and N, the text should be interpreted as requiring only one element from the group, not A plus N, or B plus N, etc.

While the foregoing describes various embodiments of the disclosure, other and further embodiments of the disclosure may be devised based on the present disclosure. The scope of the disclosure is determined by the claims that follow. The disclosure is not limited to the described embodiments, versions, or examples, which are included to enable a person having ordinary skill in the art to make and use the disclosure when combined with information and knowledge available to the person having ordinary skill in the art.

The invention claimed is:

1. A system for providing recommendations based on handwritten data in a handwritten document, the system comprising:

a receiver module configured to fetch the handwritten data corresponding to strokes made by a user in the handwritten document on a screen of an electronic device;

a recognition module configured to:

recognize text associated with the fetched handwritten data by employing a handwriting recognition technique; and identify one or more keywords in the recognized text;

a recommendation module configured to determine one or more personalized recommendations, based on a user profile of the user, for the identified one or more keywords, using at least one of a named entity linking or a knowledge graph, wherein the one or more recommendations include at least one of: one or more handwritten documents stored in a database and one or more weblinks;

a ranking module configured to rank the determined one or more recommendations based on a similarity score of each of the determined one or more recommendations with respect to the identified one or more keywords; and a rendering module configured to render the ranked one or more recommendations to the user.

2. The system of claim 1, wherein the recommendation module is configured to:

perform sentence embeddings on the identified one or more keywords to form an updated set of keywords;

find a named entity corresponding to an updated set of keywords;

perform a spreading activation of the found named entity to form a spreading activation graph; and perform a similarity search using a similarity measure between embedding vectors to determine the one or more personalized recommendations, wherein the similarity measure includes at least a cosine distance.

3. The system as claimed in claim 1, wherein the handwritten data is received in the form of one or more tuples having at least one of: data on x-axis, data on y-axis, pressure, speed of writing, and orientation.

4. The system of claim 3, wherein the handwriting recognition techniques analyze each of the received one or more tuples to identify the closest recognized term that each of the received one or more tuples potentially represents.

5. The system of claim 1, wherein the user profile is used to determine need of the user for enhanced information related to the identified one or more keywords.

6. The system of claim 1, wherein the recommendation module matches the identified one or more keywords with one or more nodes of the knowledge graph to determine the one or more personalized recommendations, wherein each of the one or more nodes is associated with identifiers of one or more documents stored in at least one of: the database and one or more webpages.

7. The system of claim 1, wherein the one or more personalized recommendations are associated with one or more relevant documents stored in at least one of: the database and one or more webpages.

8. The system of claim 7, wherein the one or more personalized recommendations include at least one of: addresses of the one or more corresponding relevant documents and relevant text from the one or more corresponding relevant documents.

9. The system of claim 1, wherein the one or more personalized recommendations are ranked based on the relevancy of the one or more recommendations with respect to the identified one or more keywords.

10. The system of claim 1, wherein the rendering includes displaying a dynamic window overlaying the handwritten document and including the one or more personalized recommendations.

11. A method for providing recommendations based on handwritten data in a handwritten document, the method comprising:

fetching the handwritten data corresponding to strokes made by a user in the handwritten document on a screen of an electronic device;

recognizing text associated with the fetched handwritten data by employing a handwriting recognition technique;

identifying one or more keywords in the recognized text;

determining one or more personalized recommendations, based on a user profile of the user, for the identified one or more keywords, using at least one of a named entity linking or a knowledge graph, wherein the one or more recommendations include at least one of: one or more handwritten documents stored in a database and one or more weblinks;

ranking the determined one or more recommendations based on a similarity score of each of the determined one or more recommendations with respect to the identified one or more keywords; and rendering the ranked one or more recommendations to the user.

12. The method of claim 11, further comprising:

performing sentence embeddings on the identified one or more keywords to form an updated set of keywords;

finding a named entity corresponding to an updated set of keywords;

performing a spreading activation of the found named entity to form a spreading activation graph; and performing a similarity search using a similarity measure between embedding vectors to determine the one or more personalized recommendations, wherein the similarity measure includes at least a cosine distance.

13. The method of claim 11, wherein the handwritten data is received in the form of one or more tuples having at least one of: data on x-axis, data on y-axis, pressure, speed of writing, and orientation.

14. The method of claim 13, wherein the handwriting recognition techniques analyze each of the received one or more tuples to identify the closest recognized term that each of the received one or more tuples potentially represents.

15. The method of claim 11, wherein the user profile is used to determine need of the user for enhanced information related to the identified one or more keywords.

16. The method of claim 11, further comprising matching the identified one or more keywords with one or more nodes of the knowledge graph to determine the one or more recommendations.

17. The method of claim 11, wherein the one or more personalized recommendations are associated with one or more relevant documents stored in at least one of: the database and one or more webpages.

18. The method of claim 17, wherein the one or more personalized recommendations include at least one of: addresses of the one or more corresponding relevant documents and relevant text from the one or more corresponding relevant documents.

19. The method of claim 11, wherein the one or more personalized recommendations are ranked based on the relevancy of the one or more personalized recommendations with respect to the identified one or more keywords.

20. The method of claim 11, wherein the rendering includes displaying a dynamic window overlaying the handwritten document and including the one or more personalized recommendations.

* * * * *